(12) United States Patent
Whitehouse et al.

(10) Patent No.: US 8,621,169 B2
(45) Date of Patent: Dec. 31, 2013

(54) METHOD FOR ADDRESS SPACE LAYOUT RANDOMIZATION IN EXECUTE-IN-PLACE CODE

(75) Inventors: Oliver Whitehouse, Berkshire (GB); Benjamin Winston, London (GB); Michael E. McCallum, Waterloo (CA)

(73) Assignee: BlackBerry Limited, Waterloo (CA)

( * ) Notice: Subject to any disclaimer, the term of this patent is extended or adjusted under 35 U.S.C. 154(b) by 968 days.

(21) Appl. No.: 12/635,208

(22) Filed: Dec. 10, 2009

(65) Prior Publication Data

US 2011/0145472 A1 Jun. 16, 2011

(51) Int. Cl.
*G06F 12/02* (2006.01)
(52) U.S. Cl.
USPC .................... 711/165; 711/170; 711/E12.002
(58) Field of Classification Search
None
See application file for complete search history.

(56) References Cited

U.S. PATENT DOCUMENTS

| | | | |
|---|---|---|---|
| 6,363,463 B1 * | 3/2002 | Mattison | 711/164 |
| 6,574,747 B2 | 6/2003 | Ginsberg | |
| 2001/0029564 A1 * | 10/2001 | Estakhri et al. | 711/103 |
| 2003/0196066 A1 * | 10/2003 | Mathews | 711/207 |
| 2004/0078509 A1 * | 4/2004 | Malueg et al. | 711/100 |
| 2005/0097246 A1 | 5/2005 | Chen | |
| 2007/0039048 A1 | 2/2007 | Shelest | |
| 2007/0283130 A1 * | 12/2007 | Bolanowski et al. | 712/14 |
| 2008/0126742 A1 * | 5/2008 | Shupak et al. | 711/217 |

OTHER PUBLICATIONS

Lixin Li et al: "Address-Space Randomization for Windows Systems"; Computer Security Applications Conference, 2006. ACSAC '06. 22nd Annual, IEEE, PI, Dec. 1, 2006, pp. 329-338, XP031033572.
DESkey Hardware; Data Encryption Systems Limited; UK; http://www.deskey.co.uk; retrieved Mar. 2, 2010.

* cited by examiner

*Primary Examiner* — Michael Krofcheck
(74) *Attorney, Agent, or Firm* — Novak Druce Connolly Bove + Quigg LLP

(57) ABSTRACT

A method for dynamically (i.e., upon boot) rewriting, in a failure resistant manner, of part of, or the entirety of, the flash memory for a device allows for a changing of location for logical blocks of execute-in-place code. Conveniently, the rewriting results in a randomization, of varying degree, of the address space layout upon each boot up cycle.

10 Claims, 6 Drawing Sheets

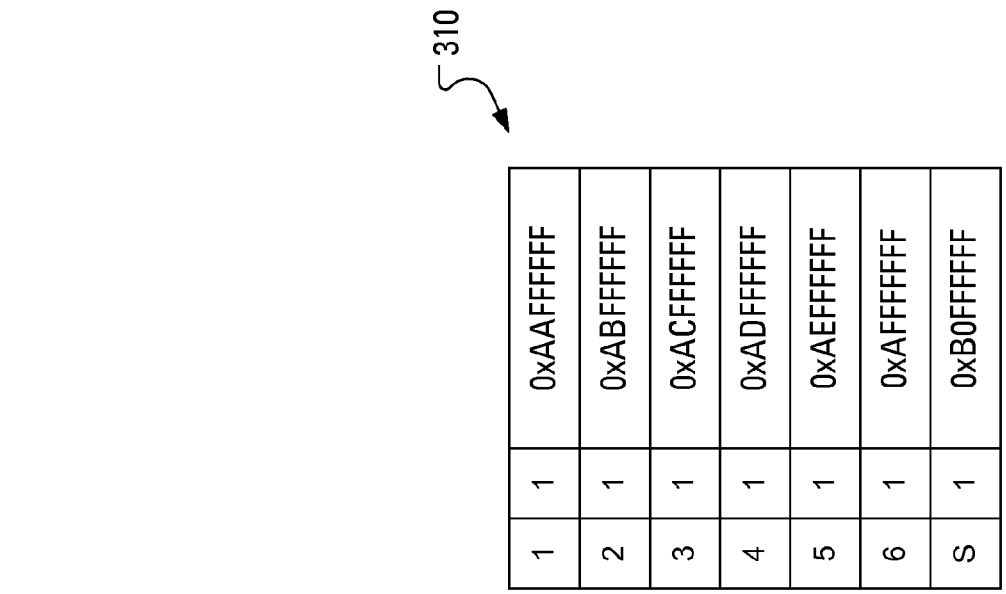
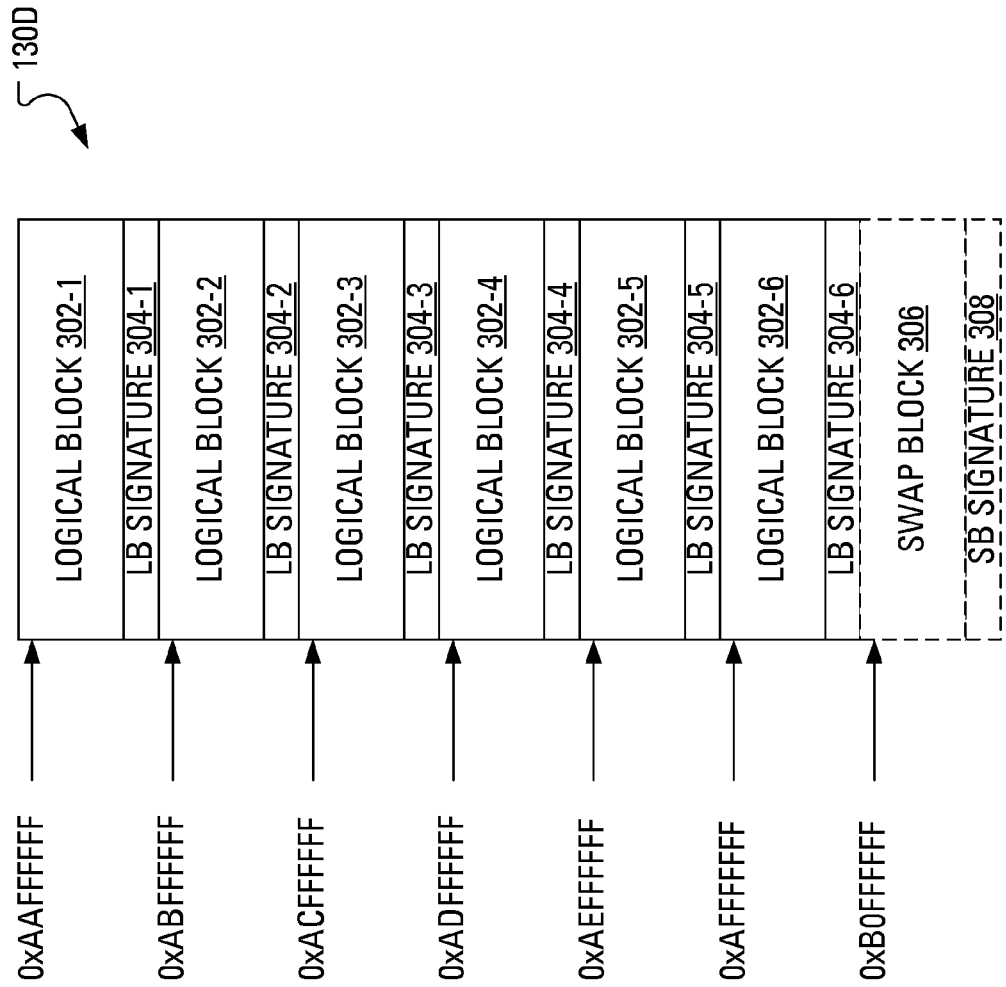
FIG. 3A
FIG. 3B

METHOD FOR ADDRESS SPACE LAYOUT RANDOMIZATION IN EXECUTE-IN-PLACE CODE

FIELD

The present application relates generally to laying out address space for execute-in-place code and, more specifically, to a method for address space layout randomization for such code.

BACKGROUND

Ahead of executing a program, executable code for which is stored on non-volatile memory, a processor will often copy the executable code into an associated volatile memory. In contrast, so-called eXecute-In-Place (XIP) systems allow for execution of programs directly from long term storage, that is, the executable code is not copied into the volatile memory, e.g., the executable code is not copied into the random access memory (RAM).

BRIEF DESCRIPTION OF THE DRAWINGS

Reference will now be made to the drawings, which show by way of example, embodiments of the present disclosure, and in which:

FIG. 3A illustrates a structure for the block of firmware code in FIG. 2, including a plurality of logical blocks and a swap block;

FIG. 3B illustrates a table related to the structure of FIG. 3A;

DETAILED DESCRIPTION OF THE EMBODIMENTS

Figure 1:
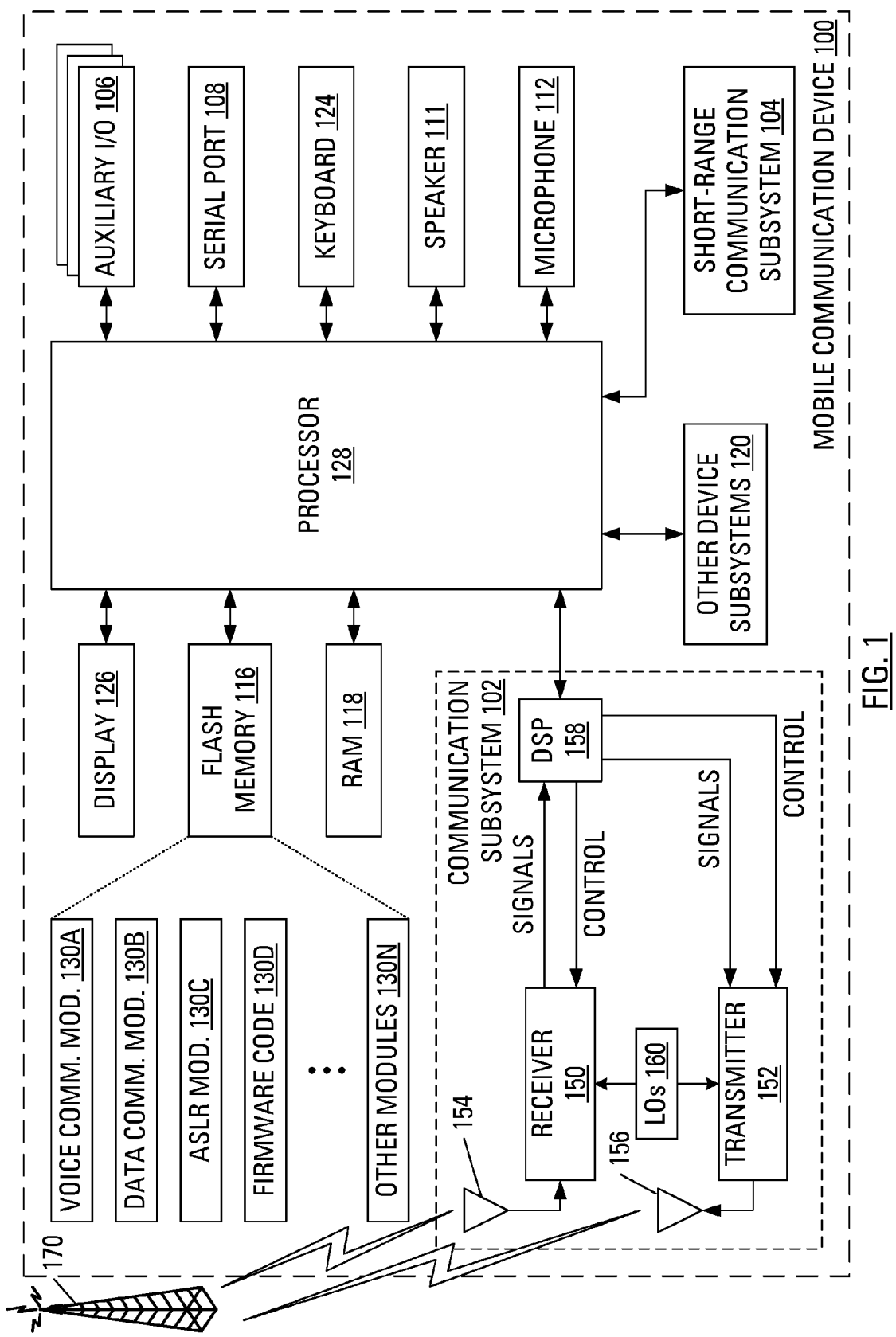
FIG. 1 illustrates a mobile communication device adapted to carry out methods representative of aspects of the present disclosure, the device including a block of firmware code representative of an execute-in-place code image.

Address space randomization is a technique used to fortify systems against buffer overflow attacks. Address space layout randomization (ASLR) is a computer security technique that involves randomly arranging the positions of key data areas in an address space of a given process. The key data areas usually include the base of the executable and the position of libraries, the heap and the stack.

ASLR hinders some types of security attacks by preventing an attacker from being able to easily predict target addresses. For example, attackers trying to execute so-called "return-to-libc attacks" must locate the code to be executed; while other attackers trying to execute shellcode injected on a stack have to first find the stack. In both cases, the related memory addresses are obscured from the attackers; these values have to be guessed and a mistaken guess is not usually recoverable due to the application crashing.

As mentioned, in a typical computing system, ahead of executing code stored in non-volatile memory, a processor will often copy the code into an associated volatile memory. In a system in which address space layout randomization has been implemented, the loader that copies the code randomizes the destination of the code in the volatile memory.

Existing execute-in-place systems, such as NOR-based flash memory devices, are precluded from randomizing the location of executable code in memory. This is due to the fact that execute-in-place code is written to NOR-based flash memory devices during a flash loading process and then executed from directly mapped flash memory instead of being copied into random access memory (RAM) by the central processing unit. Since the code is not copied into RAM, the opportunity to randomize the location of the code is lost.

A method for dynamically (i.e., upon boot) rewriting, in a failure resistant manner, of part of, or the entirety of, the flash memory for a device allows for a changing of location for logical blocks of execute-in-place code. Conveniently, the rewriting results in a randomization, of varying degree, of the address space layout upon each boot up cycle.

In an aspect of the present disclosure, there is provided a method of address space layout randomization. The method comprises storing an execute-in-place code image in a plurality of logical memory blocks occupying memory spaces having uniform dimensions, provisioning, as a swap memory block, at least one memory space having the uniform dimensions, maintaining a table of references to the plurality of logical memory blocks and the swap memory block and receiving an indication of a boot. The method further includes, responsive to the receiving: selecting a candidate logical memory block from among the plurality of logical memory blocks; reading contents of a memory space occupied by the candidate logical memory block; and writing the contents to the memory space provisioned as the swap memory block. In other aspects of the present disclosure, a computing apparatus is provided adapted to carry out this method and a computer readable medium is provided to contain instructions allowing a processor to carry out this method.

Other aspects and features of the present invention will become apparent to those of ordinary skill in the art upon review of the following description of specific embodiments of the invention in conjunction with the accompanying figures.

FIG. 1 illustrates a mobile communication device 100 as an example of a device that may carry out methods representative of aspects of the present disclosure. The mobile communication device 100 includes a housing, an input device (e.g., a keyboard 124 having a plurality of keys) and an output device (e.g., a display 126), which may comprise a full graphic, or full color, Liquid Crystal Display (LCD). In some embodiments, the display 126 may comprise a touchscreen display. In such embodiments, the keyboard 124 may comprise a virtual keyboard. Other types of output devices may alternatively be utilized. A processing device (a processor 128) is shown schematically in FIG. 1 as coupled between the keyboard 124 and the display 126. The processor 128 controls the operation of the display 126, as well as the overall operation of the mobile communication device 100, in part, responsive to actuation of the keys on the keyboard 124 by a user.

The housing may be elongated vertically, or may take on other sizes and shapes (including clamshell housing structures). Where the keyboard 124 includes keys that are associated with at least one alphabetic character and at least one numeric character, the keyboard 124 may include a mode selection key, or other hardware or software, for switching between alphabetic entry and numeric entry.

In addition to the processor 128, other parts of the mobile communication device 100 are shown schematically in FIG. 1. These may include a communications subsystem 102, a short-range communications subsystem 104, the keyboard 124 and the display 126. The mobile communication device 100 may further include other input/output devices, such as a set of auxiliary I/O devices 106, a serial port 108, a speaker 111 and a microphone 112. The mobile communication device 100 may further include memory devices including a flash memory 116 and a Random Access Memory (RAM) 118 and various other device subsystems 120. The mobile communication device 100 may comprise a two-way radio frequency (RF) communication device having voice and data communication capabilities. In addition, the mobile communication device 100 may have the capability to communicate with other computer systems via the Internet.

Operating system software executed by the processor 128 may be stored in a computer readable medium, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device may also be stored to the RAM 118.

The processor 128, in addition to its operating system functions, enables execution of software applications on the mobile communication device 100. A predetermined set of software applications that control basic device operations, such as a voice communications module 130A and a data communications module 130B, may be installed on the mobile communication device 100 during manufacture. An address space layout randomization module 130C may also be installed on the mobile communication device 100 during manufacture, to implement aspects of the present disclosure. In particular, the address space layout randomization (ASLR) module 130C may be configured to act on a block of firmware code 130D. As well, additional software modules, illustrated as an other software module 130N, which may be, for instance, a PIM application, may be installed during manufacture. The PIM application may be capable of organizing and managing data items, such as e-mail messages, calendar events, voice mail messages, appointments and task items. The PIM application may also be capable of sending and receiving data items via a wireless carrier network 170 represented by a radio tower. The data items managed by the PIM application may be seamlessly integrated, synchronized and updated via the wireless carrier network 170 with the device user's corresponding data items stored or associated with a host computer system.

Communication functions, including data and voice communications, are performed through the communication subsystem 102 and, possibly, through the short-range communications subsystem 104. The communication subsystem 102 includes a receiver 150, a transmitter 152 and one or more antennas, illustrated as a receive antenna 154 and a transmit antenna 156. In addition, the communication subsystem 102 also includes a processing module, such as a digital signal processor (DSP) 158, and local oscillators (LOs) 160. The specific design and implementation of the communication subsystem 102 is dependent upon the communication network in which the mobile communication device 100 is intended to operate. For example, the communication subsystem 102 of the mobile communication device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), etc. Other types of data and voice networks, both separate and integrated, may also be utilized with the mobile communication device 100.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the mobile communication device 100 may send and receive communication signals over the wireless carrier network 170. Signals received from the wireless carrier network 170 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the wireless carrier network 170 are processed (e.g., modulated and encoded) by the DSP 158 and are then provided to the transmitter 152 for digital to analog conversion, frequency up conversion, filtering, amplification and transmission to the wireless carrier network 170 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 102 and is input to the processor 128. The received signal is then further processed by the processor 128 for output to the display 126, or alternatively to some auxiliary I/O devices 106. A device user may also compose data items, such as e-mail messages, using the keyboard 124 and/or some other auxiliary I/O device 106, such as a touchpad, a rocker switch, a thumb-wheel, a trackball, a touchscreen, or some other type of input device. The composed data items may then be transmitted over the wireless carrier network 170 via the communication subsystem 102.

In a voice communication mode, overall operation of the device is substantially similar to the data communication mode, except that received signals are output to the speaker 111, and signals for transmission are generated by a microphone 112. Alternative voice or audio I/O subsystems, such as a voice message recording subsystem, may also be implemented on the mobile communication device 100. In addition, the display 126 may also be utilized in voice communication mode, for example, to display the identity of a calling party, the duration of a voice call, or other voice call related information.

The short-range communications subsystem 104 enables communication between the mobile communication device 100 and other proximate systems or devices, which need not necessarily be similar devices. For example, the short-range communications subsystem may include an infrared device and associated circuits and components, or a Bluetooth™ communication module to provide for communication with similarly-enabled systems and devices.

Firmware is a term sometimes used to denote fixed, usually rather small, programs that internally control various electronic devices. Simple firmware is typically stored in read-only memory (ROM), while more complex firmware is typically stored in flash, Random Access Memory (RAM), thereby allowing for updates to the program code.

Figure 2:
FIG. 2 illustrates a structure for a typical, prior art, monolithic block of firmware code.

A structure for a typical, prior art, monolithic block 200 of firmware code is illustrated in FIG. 2. The block 200 includes a NOR-based, execute-in-place code image 202 and a signature 204. The signature 204 may, for example, be a value obtained by applying a hash function to the code image 202.

It is proposed herein to divide the block 200 firmware code into a plurality of logical blocks.

FIG. 3A illustrates the block 130D of firmware code, representative of a proposed execute-in-place code image, which may be considered to include a plurality of individual blocks of original object code output by a compiler before linking. In FIG. 3A, the block 130D has been divided into: a first logical block 302-1, with corresponding first signature 304-1; a second logical block 302-2, with corresponding second signature 304-2; a third logical block 302-3, with corresponding third signature 304-3; a fourth logical block 302-4, with corresponding fourth signature 304-4; a fifth logical block 302-5, with corresponding fifth signature 304-5; and a sixth logical block 302-6, with corresponding sixth signature 304-6. Collectively or individually, the logical blocks may be referred to by reference number 302 and the signatures may be referred to by reference number 304. It will be clear to a person of ordinary skill that aspects of the disclosure are not to be limited to six logical blocks. Indeed, there may be more than six or fewer than six logical blocks 302. Each signature 304 may, for example, be a value obtained by applying a hash function to the contents of the corresponding logical block 302.

Each logical block 302 may, for example, correspond to one of the plurality of individual blocks of original object code. To facilitate later swapping, each logical block 302 may be formed to have uniform dimensions. As will be understood, the blocks of original object code are unlikely to have uniform dimensions. Accordingly, forming the logical blocks 302 to have uniform dimensions may require inserting padding into the logical blocks 302.

The block 130D of firmware code of FIG. 3A also includes a swap block 306 and a swap block signature 308. The combination of the swap block 306 and the swap block signature 308 represent pre-designated memory space in the uniform dimension of the combinations of logical blocks 302 and corresponding signatures 304.

FIG. 3B illustrates a table 310. Upon boot up of the mobile communication device 100, a "boot loader" (executed on the processor 128) may link (e.g., using static-dynamic linking), via the table 310, functions of the individual blocks of original object code that are represented by the logical blocks 302. The table 310 may be stored at the mobile communication device 100 in a page of memory in RAM 118, thereby providing an element of tamper resistance. Once the boot loader has linked the functions of the logical blocks 302, the boot loader may set, to read-only, the page of memory in RAM 118 in which the table 310 is stored. In particular, the boot loader may employ a Memory Management Unit (MMU, not shown) to set the page as read-only.

Figure 4:
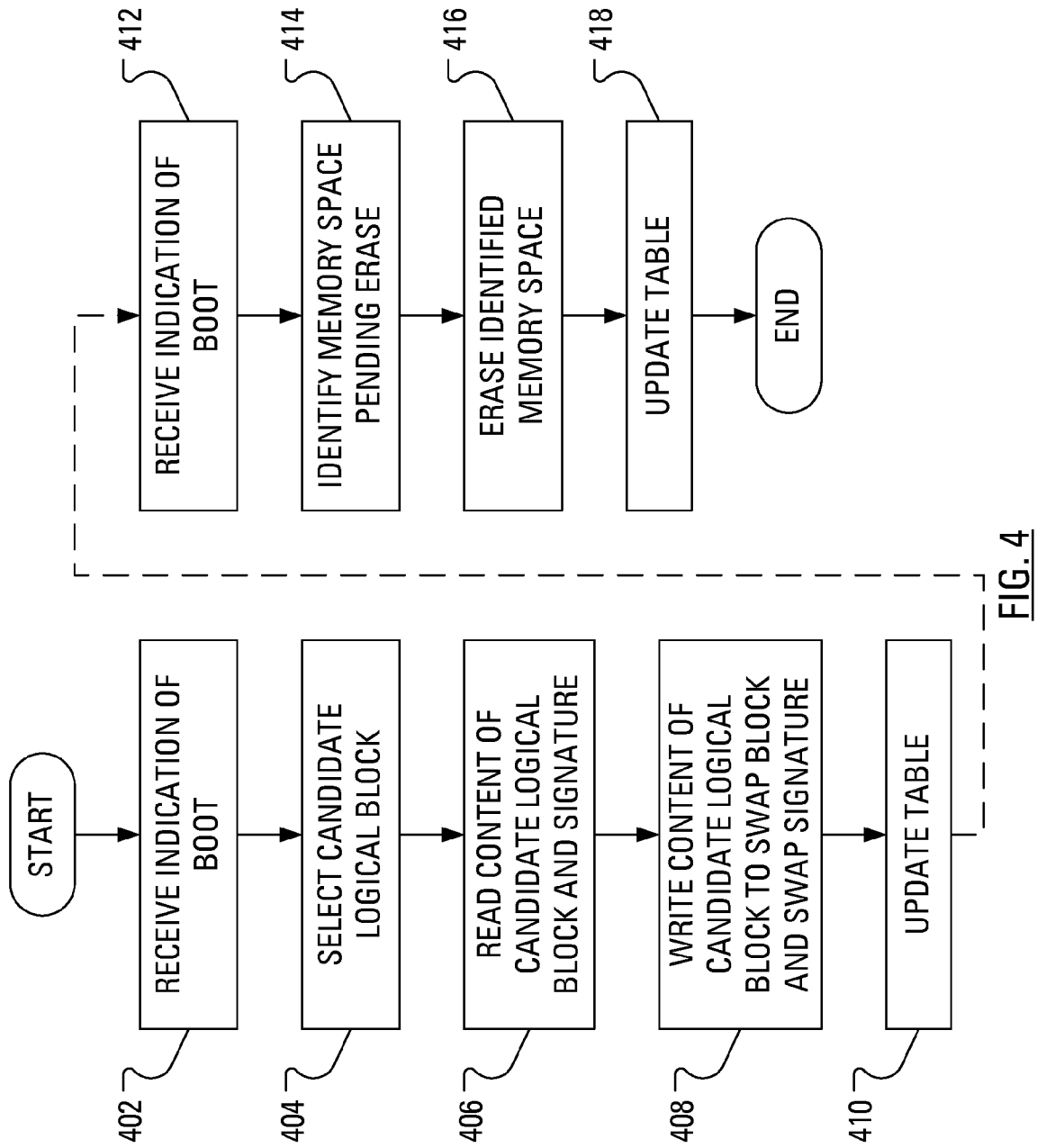
FIG. 4 illustrates example steps in an address space layout randomization method, in accordance with an aspect of the present disclosure.

Also during boot up of the mobile communication device 100, one or more (depending on the amount of free storage) of the logical blocks 302 may be swapped. FIG. 4 illustrates example steps of an address space layout randomization method that implements the swapping.

Initially, the ASLR module 130C may receive (step 402) an indication that a boot has recently occurred. Responsive to such receiving, the ASLR module 130C may select (step 404) a candidate logical block 302 from among the plurality of logical blocks 302 into which the block 130D of firmware code has been divided. For example, the ASLR module 130C may select the second logical block 302-2 as the candidate logical block. The ASLR module 130C may then read (step 406) the content of the memory space occupied by the candidate logical block 302-2 and the contents of the memory space occupied by the corresponding signature block 304-2. At the completion of the read operation, the ASLR module 130C may write (step 408) the read contents to the memory space provisioned as the swap memory block 306 and the swap block signature 308. As part of the write process (step 408), the ASLR module 130C may perform a check by obtaining a hash of the contents of the logical block 302 and comparing the recently obtained hash against the corresponding signature 304.

At the completion of the write operation, the ASLR module 130C may update (step 410) the table 310 to indicate that the starting address for the logical memory block 302-2 is now 0xB0FFFFFF, i.e., the former starting address of the swap memory block 306 and the swap block signature 308. Updating the table 310 may also involve the ASLR module 130C associating a "pending erase" flag with the memory space (starting at 0xABFFFFFF) from which the logical memory block 302-2 and the corresponding signature block 304-2 have been copied.

Figures 5A, 5B:
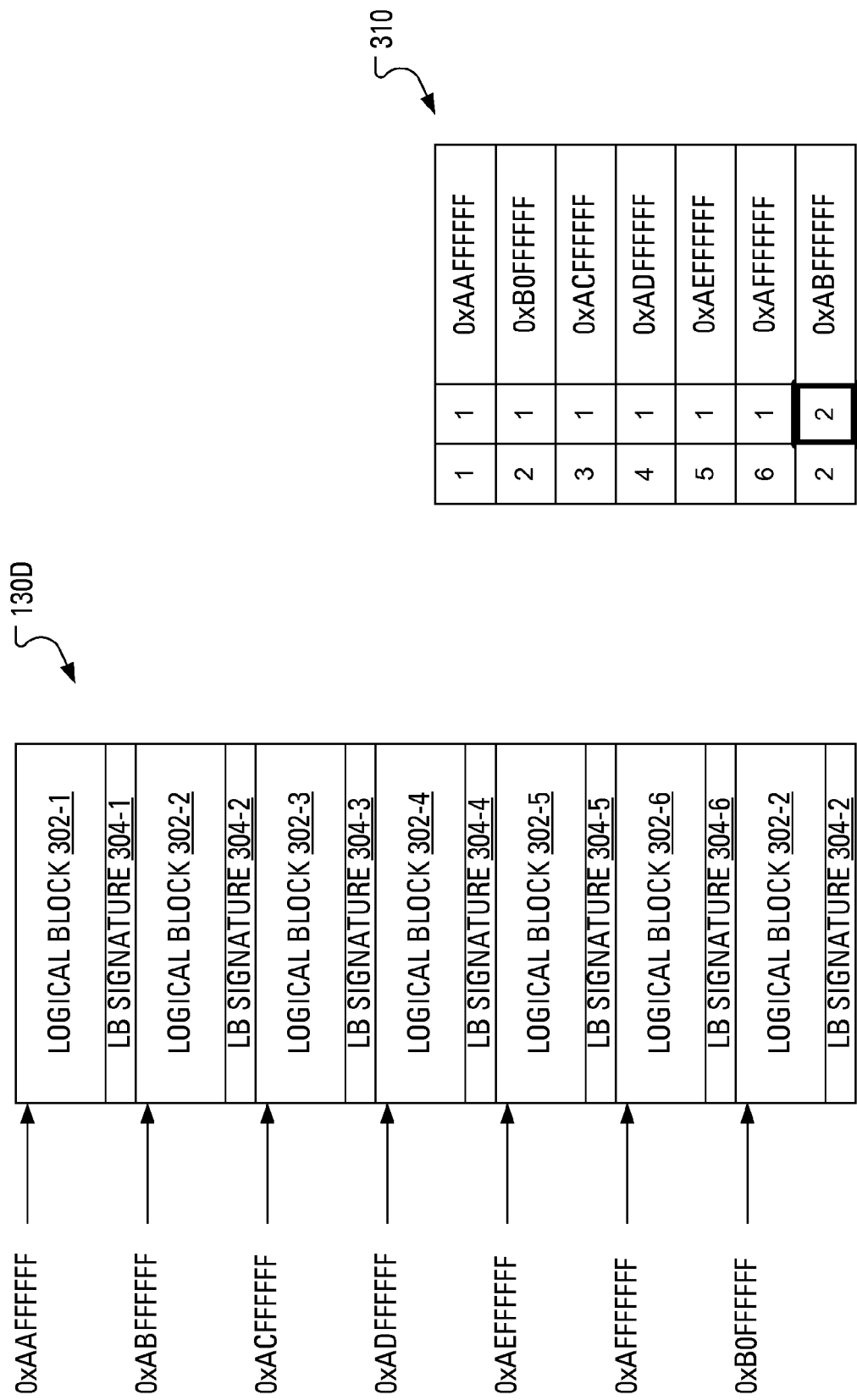
FIG. 5A illustrates the structure of the block of FIG. 3A with the contents of one logical block written to a memory space formerly provisioned as the swap block.
FIG. 5B illustrates a table related to the structure of FIG. 5A.

FIG. 5A illustrates the block 130D of firmware code after a swapping process (steps 402, 404, 406, 408 and 410) wherein the ASLR module 130C has copied the contents of the second logical block 302-2 and corresponding second signature 304-2 to the memory space previously identified (in FIG. 3A) as the swap block 306 and swap block signature 308. Additionally, the ASLR module 130C has updated the table so that the address of the beginning of the second logical block 302-2 has been appropriately changed the address (0xB0FFFFFF) formerly assigned to the beginning of the swap block 306.

Furthermore, in FIG. 5A, the contents of the memory space at the original location of the second logical block 302-2 and the corresponding second signature 304-2 remains unchanged. However, the ASLR module 130C has updated the table 310 (FIG. 5B) so that a flag 502 is set, where the flag (in this case, a "2") indicates that the memory space (starting at 0xABFFFFFF) of the original location of the second logical block 302-2 and the corresponding second signature 304-2 is "pending erase".

The swap process may be repeated for a number of times corresponding to a number of available swap blocks.

Some time later, at the next successful boot up, the ASLR module 130C may receive (step 412) an indication that a boot has recently occurred. Responsive to such receiving, the ASLR module 130C may identify (step 414), through location of the flag 502 in the table 310, a portion of the block 130D of firmware code that is pending erase. The ASLR module 130C may then erase (step 416) the identified portion of the block 130D of firmware code that is pending erase, thereby provisioning the original location of the second logical block 302-2 and the corresponding second signature 304-2 as the new swap block 306 and corresponding swap block signature 308 (see FIG. 6A).

Figures 6A, 6B:
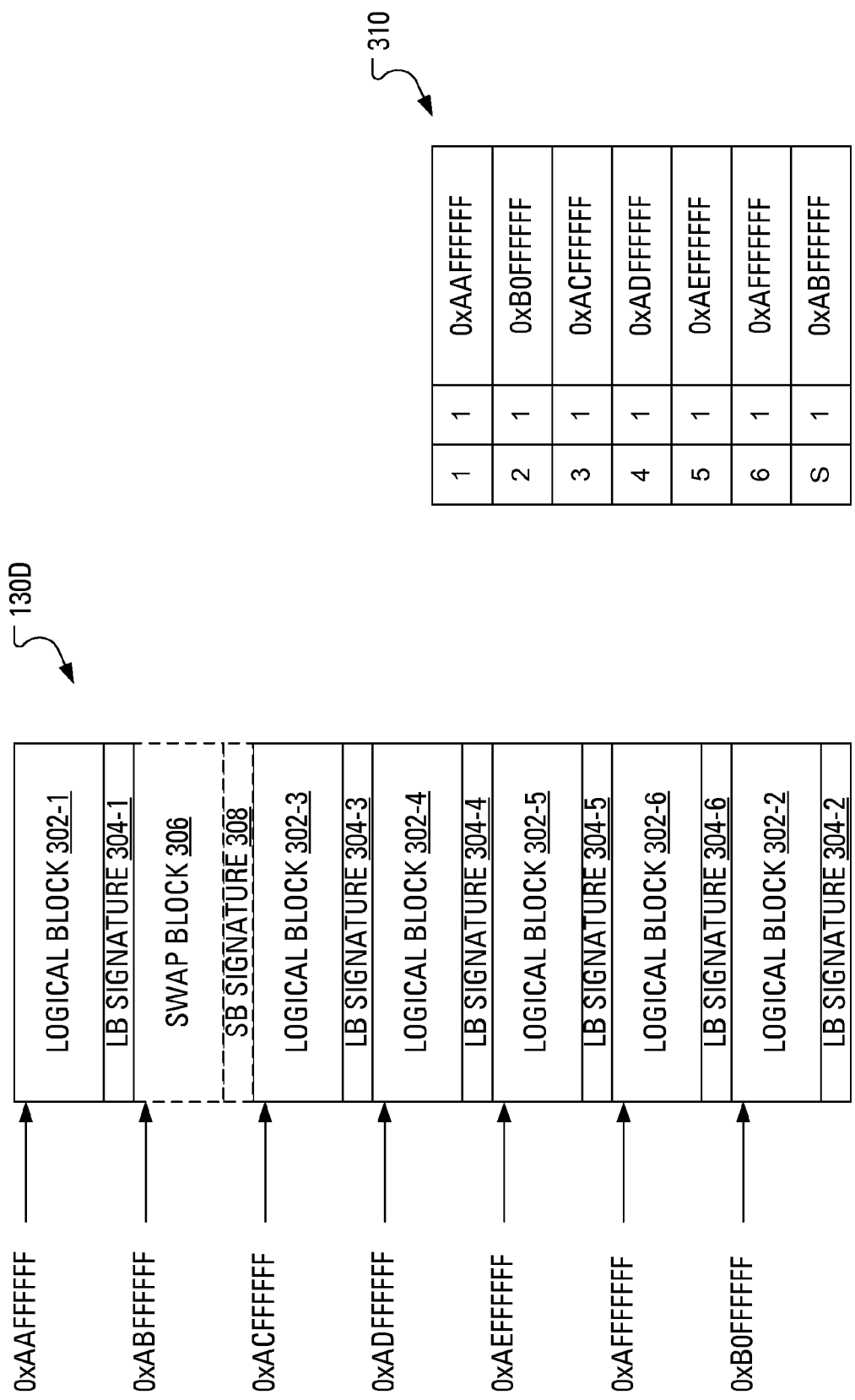
FIG. 6A illustrates the structure of the block of FIG. 5A following erasure of the contents of the memory space formerly occupied by the logical block written to the swap block in FIG. 5A.
FIG. 6B illustrates a table related to the structure of FIG. 6A.

Additionally, the ASLR module 130C may update (step 418) the table 310 to show that the memory space formerly occupied by the second logical block 302-2 and the corresponding second signature 304-2 are now provisioned as the new swap block 306 and corresponding swap block signature 308 (see table 310 in FIG. 6B).

The swapping process provides an efficient method of providing varying degrees of randomization for execute-in-place devices between each boot up, while also ensuring failure resistance. The failure resistance arises from the maintenance of the contents of the logical block that is copied to the swap block until the next boot. In the event that the reading (step 406) and writing (step 408) is, somehow, corrupted or interrupted during an attempted swap, the check of a hash of the logical block 302 against the corresponding signature 304 will fail. In which case, the ASLR module 130C may not update the table 310 to flag, as pending erase, the former memory space of the logical block 302 and the corresponding signature 304. Instead, the ASLR module 130C may update the table 310 to flag, as pending erase, the memory space formerly provisioned as the swap block 306 and corresponding swap block signature 308, thereby reverting to the configuration in place before the attempted swap.

As will be clear to a person of ordinary skill, the block 130D of firmware code may be representative of an entire operating system for the mobile communication device 100. However, such a code image is likely to be large and require time-intensive processing. Accordingly, aspects of the present disclosure should only be applied to an operating system if time permits.

In a second aspect of the present disclosure, the boot loader may enter a jumble mode. In such a jumble mode, a plurality of logical blocks be moved to new locations prior to the continuation of the boot process. Such a jumble mode is expected to be feasible due to the fact that no execute-in-place code, other than the boot ROM (which is not subject to the jumble mode), will be executing and thus can be swapped freely. The nature of the jumble mode may be enterprise-defined or user-defined.

The method of dynamic-static-linking described above could also be applied to NAND-based flash devices to provide ASLR style protection also during the loading from flash to RAM during boot up.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method of address space layout randomization for execute-in-place code, said method comprising:
   storing an execute-in-place code image in a plurality of logical memory blocks occupying memory spaces having uniform dimensions;
   provisioning, as a swap memory block, at least one memory space having said uniform dimensions, wherein said at least one memory space is among, and in addition to, said memory spaces storing said execute-in-place code;
   maintaining a table of references to said plurality of logical memory blocks and said swap memory block;
   receiving an indication of a boot; and
   responsive to said receiving:
   selecting a candidate logical memory block from among said plurality of logical memory blocks;
   reading contents of a memory space occupied by said candidate logical memory block; and
   writing said contents to said memory space provisioned as said swap memory block.

2. The method of claim 1 further comprising indicating, in said table, that a memory space occupied by said candidate logical memory block is pending erase.

3. The method of claim 1 further comprising indicating, in said table, that said candidate logical memory block occupies said memory space provisioned as said swap memory block.

4. The method of claim 1 further comprising storing, in correspondence with each logical memory block of said plurality of logical memory blocks, a signature.

5. The method of claim 4 further comprising obtaining said signature as a hash of contents of said each logical memory block.

6. The method of claim 5 wherein said writing further comprises obtaining a hash of said contents and comparing said hash against said signature.

7. The method of claim 1 further comprising:
   receiving an indication of a subsequent boot; and
   responsive to said receiving said indication of said subsequent boot:
   identifying a candidate memory space pending erase; and
   erasing said candidate memory space.

8. The method of claim 7 further comprising indicating, in said table, that said candidate memory space is said swap memory block.

9. A computing apparatus comprising a processor adapted to:
   store an execute-in-place code image in a plurality of logical memory blocks occupying memory spaces having uniform dimensions;
   provision, as a swap memory block, at least one memory space having said uniform dimensions, wherein said at least one memory space is among, and in addition to, said memory spaces storing said execute-in-place code;
   maintain a table of references to said plurality of logical memory blocks and said swap memory block;
   receive an indication of a boot; and
   responsive to said receiving:
   select a candidate logical memory block from among said plurality of logical memory blocks;
   read contents of a memory space occupied by said candidate logical memory block; and
   write said contents to said memory space provisioned as said swap memory block.

10. A non-transitory computer-readable medium containing computer-executable instructions that, when performed by a processor, cause said processor to:
- store an execute-in-place code image in a plurality of logical memory blocks occupying memory spaces having uniform dimensions;
- provision, as a swap memory block, at least one memory space having said uniform dimensions, wherein said at least one memory space is among, and in addition to, said memory spaces storing said execute-in-place code;
- maintain a table of references to said plurality of logical memory blocks and said swap memory block;
- receive an indication of a boot; and
- responsive to said receiving:
  - select a candidate logical memory block from among said plurality of logical memory blocks;
  - read contents of a memory space occupied by said candidate logical memory block; and
  - write said contents to said memory space provisioned as said swap memory block.

\* \* \* \* \*